(12) United States Patent
Yoshida

(10) Patent No.: US 8,335,008 B2
(45) Date of Patent: *Dec. 18, 2012

(54) PRINTING SYSTEM AND PRINTER WITH SETTING SWITCH

(75) Inventor: Hitoshi Yoshida, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/926,180

(22) Filed: Oct. 29, 2010

(65) Prior Publication Data

US 2011/0051192 A1    Mar. 3, 2011

Related U.S. Application Data

(63) Continuation of application No. 10/951,602, filed on Sep. 29, 2004, now Pat. No. 7,826,079.

(30) Foreign Application Priority Data

Nov. 21, 2003    (JP) ................................. 2003-391796

(51) Int. Cl.
  *G06F 15/00* (2006.01)
  *G06F 3/12* (2006.01)

(52) U.S. Cl. ...................................... 358/1.15; 358/1.14

(58) Field of Classification Search ................... 358/1.1, 358/1.8, 1.9, 1.13, 1.15, 1.18, 448, 474, 402
See application file for complete search history.

(56) References Cited

U.S. PATENT DOCUMENTS

| 5,431,505 | A | 7/1995 | Kato et al. |
| 6,029,238 | A | 2/2000 | Furukawa |
| 6,163,658 | A | 12/2000 | Suzuki |
| 6,814,510 | B1 * | 11/2004 | Sabbagh et al. ............... 400/63 |
| 7,281,064 | B2 * | 10/2007 | Wanda ........................... 710/19 |
| 7,295,336 | B2 * | 11/2007 | Yoshida et al. ............. 358/1.15 |
| 7,440,125 | B2 * | 10/2008 | Maekawa et al. ........... 358/1.15 |
| 2002/0048039 | A1 | 4/2002 | Nishikawa |
| 2005/0111022 | A1 | 5/2005 | Farrell et al. |
| 2010/0157367 | A1 * | 6/2010 | Han ............................. 358/1.15 |

FOREIGN PATENT DOCUMENTS

JP    11249989 A    9/1999

* cited by examiner

*Primary Examiner* — Gabriel Garcia
(74) *Attorney, Agent, or Firm* — Rabin & Berdo, P.C.

(57) ABSTRACT

A host device is connected to at least one printer through a network. Before printing, the host device broadcasts a query on the network, selects a printer that replies to the query, and sends printer setting information to the printer. The printer includes a setting switch that can be set to different states to accept or reject the printer setting information. A printer replies to the query only if its setting switch is set to the state that accepts the printer setting information. The setting switch avoids the generation of unnecessary replies and thereby simplifies the selection of the printer, as well as protecting the printer from unwanted alteration of its settings.

25 Claims, 17 Drawing Sheets

PRINTING SYSTEM AND PRINTER WITH SETTING SWITCH

CROSS-REFERENCE TO RELATED APPLICATION

This application is a continuation of application Ser. No. 10/951,602, filed Sep. 29, 2004, the entire disclosure of which is incorporated herein by reference.

BACKGROUND OF THE INVENTION

1. Field of the Invention

The present invention relates to a printing system comprising a host device and a printer connected through a network.

2. Description of the Related Art

As computing devices are increasingly being networked, printing systems of this type have become increasingly common. In many cases, multiple host devices and multiple printers are linked to the same network. When a host device has data to be printed, it selects one of the connected printers and sends the data to the selected printer. First, however, the host device may also need to set the printer up by selecting a particular printing mode, such as a particular printing density, possibly changing settings that have been made previously by the same or another host device. The new settings are stored in a memory in the printer.

The information set by a host device in a printer is not limited to printing mode settings. For example, Internet Protocol (IP) addresses are often used to facilitate access to networked printers, but most printers lack a control panel from which an IP address can be entered, so the IP address must be sent to the printer from a host device.

A conventional procedure used for selecting a printer and setting it up starts by having a host device broadcast a query on the network, asking for replies from devices that can accept printer setting information. Typically, the host device receives replies from all printers connected to the network, and does not receive replies from other types of devices. The operator of the host device sees a list of printers, identified by their network addresses, displayed on a screen, and selects one printer from the list. The host device then sends the necessary printer setting information to the selected printer.

A problem is that the network addresses seen by the operator generally give few clues as to the location or identity of the printers. For example, the network addresses may be IP addresses or Ethernet media access control addresses, which are strings of digits, and an address may identify, not the printer itself, but a network interface card installed in the printer. Considerable time and effort may be required to determine which address belongs to which printer in the network, and the operator can easily make a mistake, causing the host device to try to set up the wrong printer. The problem can be alleviated to some extent by translating a printer's IP address into a more easily recognizable name, but network addresses of the readily mistakable type must still be used when, for example, a printer is first connected to the network and has not yet been given either an easily recognizable name or an IP address. (Ethernet is a registered trademark.)

A further problem is that the conventional procedure generates unnecessary network traffic in the form of, for example, responses from printers that do not need to be set up.

Japanese Unexamined Patent Application Publication No. 11-249989 proposes a scheme in which, after sending the initial query and receiving responses, the host device sends the selected printer the well-known Ping command to determine whether it has an IP address, and uses the IP address, if it has been correctly set, to make further settings. This scheme provides a way to confirm that the intended printer has been selected, but the Ping command generates additional network traffic and creates further delays in the setting procedure, because the host device has to wait for a response to the Ping command.

If there is a delay between the response to the initial query and the sending of the printer setting information, yet another problem may occur: during the delay, a different host device may attempt to set up the same printer.

A more general problem is that when host devices and printers are interconnected by a network there is always the possibility that the settings of a printer may be tampered with, inadvertently or otherwise, by a host device that should not alter the settings of that particular printer.

SUMMARY OF THE INVENTION

An object of the present invention is to simplify the selection of a printer to be set up from a host device to which the printer is connected via a network.

Another object of the invention is to prevent the unintended alteration of printer settings by a host device to which the printer is connected via a network.

Yet another object is to reduce network traffic.

In the invented printing system, the host device transmits a query on the network to inquire whether devices connected to the network can receive and store printer setting information, then sends printer setting information to a printer replying to the query. The printer has a memory for storing the printer setting information, a setting switch that can be set to different states to indicate whether printer setting information received from the host device can be written into the memory, a decision unit that reads the state of the setting switch and decides accordingly whether or not a response to the query received from the host device is necessary, a response unit that responds to the query received from the host device if necessary, and a setting information writer that writes the printer setting information received from the host device into the memory.

In a printing system with a plurality of printers of the invented type, before the host device broadcasts the query, it is possible to set the setting switches in the printers so that only a limited number of printers, e.g., only one printer, respond to the query. The task of choosing one printer to set up from among the printers that respond to the query is then greatly simplified, as compared with conventional systems in which all printers respond, and network traffic is reduced because some printers do not respond to the query. A printer's settings can furthermore be protected from unintended alteration simply by placing the printer's setting switch in the state that prevents the printer from responding to set-up queries from host devices.

DETAILED DESCRIPTION OF THE INVENTION

Figure 1:
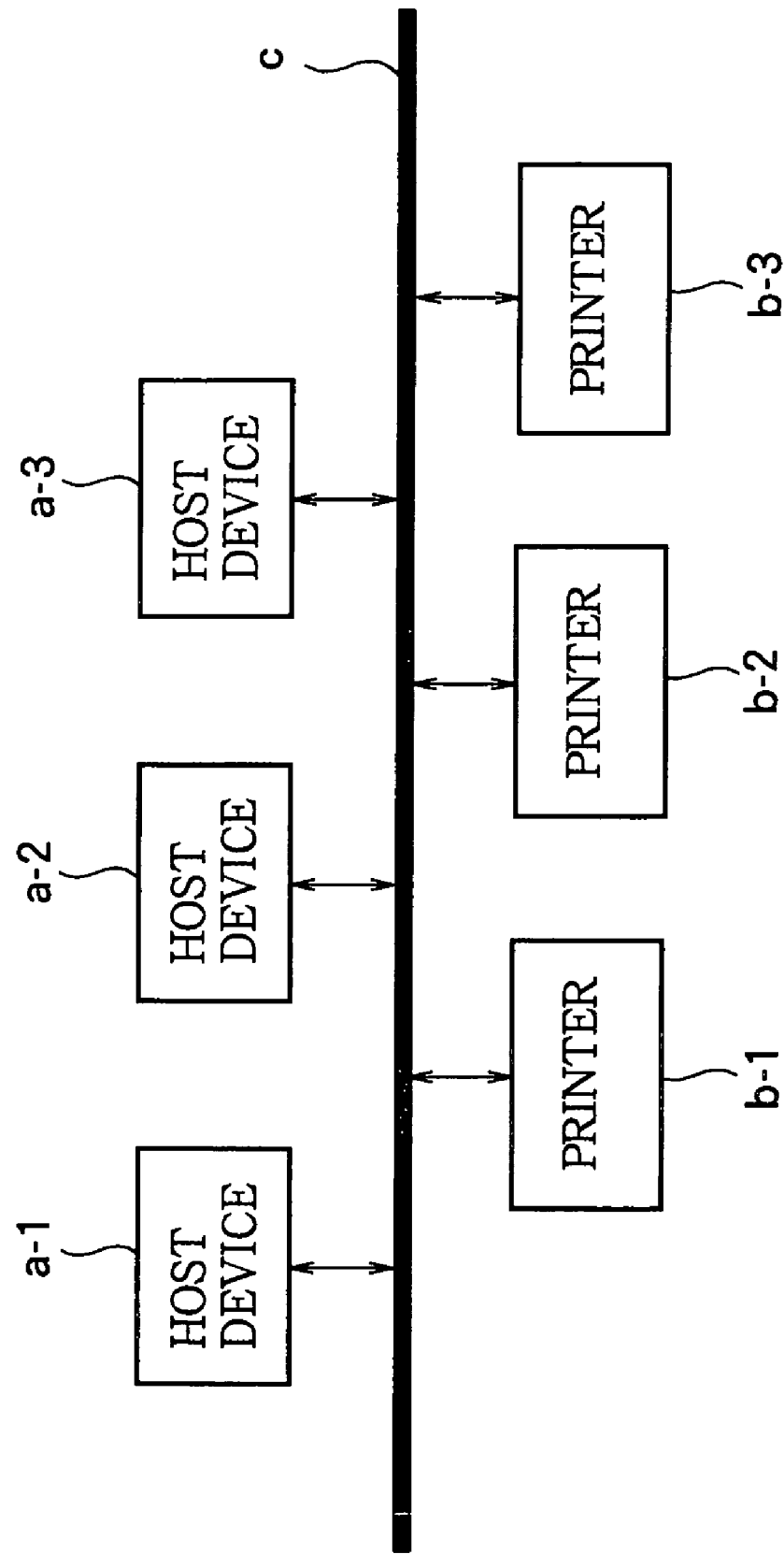
FIG. 1 illustrates the configuration of the printing system in the present invention.

Embodiments of the invention will now be described with reference to the attached drawings, in which like elements are indicated by like reference characters.

As shown in FIG. 1, in a printing system according to the present invention, a plurality of host devices a-1, a-2, a-3 are connected to a plurality of printers b-1, b-2, b-3 through a network c. For purposes of illustration, only these three host devices and three printers are shown, but many other devices (not shown) may be connected the network as well.

The host devices a-1, a-2, a-3 are network terminal devices such as personal computers (PC) on which an operator can create a print job and send it to a printer. The host devices a-1, a-2, a-3 include setting information sending means that send setting information (referred to as printer setting information below) to the printers b-1, b-2, b-3 through the network c.

The printers b-1, b-2, b-3 are network terminal devices that receive print jobs from the host devices a-1, a-2, a-3 through the network c and output printed images.

The network c is a communication network such as a local area network (LAN), normally comprising communication lines installed in a relatively small area.

In this printing system, the invention is applied when host device a-1, for example, sets up printer b-1, for example, by selecting a printing mode such as a printing density or assigning an IP address, or when host device a-1 updates these settings in printer b-1. Like most printers in recent years, printer b-1 lacks a control panel on which these settings can be entered, so the setting information must be sent to the printer from a host device.

The object of easy and accurate setting or updating of printing modes, conditions, and other information in a printer from a host device connected to the printer through a network can be achieved simply by providing, in the printer, a switch that determines in advance whether or not the printing modes, conditions, and other information can be set or updated.

First Embodiment

Figure 2:
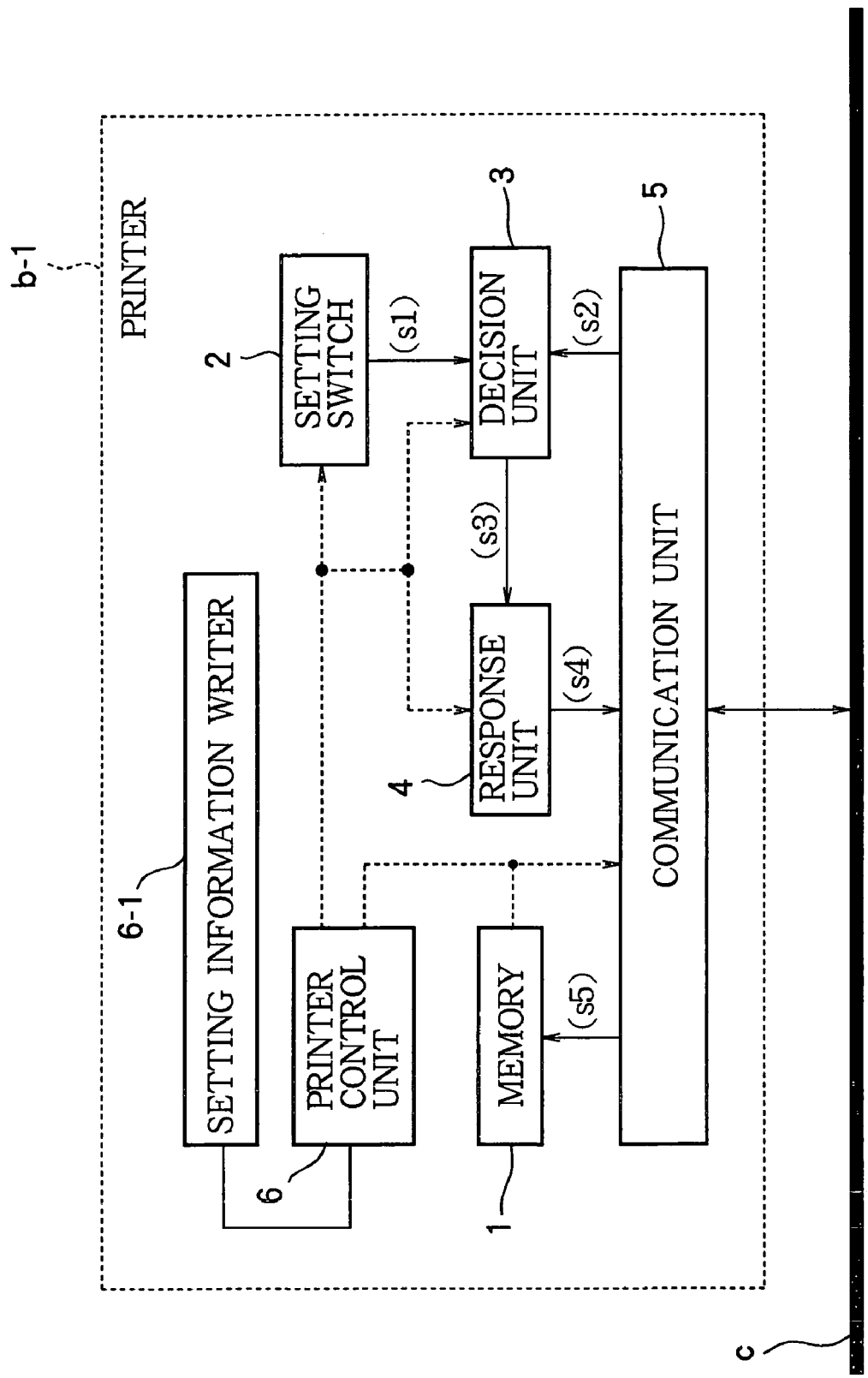
FIG. 2 is a block diagram of a printer according to a first embodiment of the invention.

Referring to FIG. 2, a printer according to a first embodiment of the invention comprises a memory 1, a setting switch 2, a decision unit 3, a response unit 4, a communication unit 5, and a printer control unit 6.

The memory 1 is a nonvolatile memory that stores the setting information of the printer b-1. The setting information includes a power management mode switching time, general printing settings such as the printing density, and an IP number specific to the printer b-1.

The setting switch 2 is a switch that an operator sets to different states that determine, in advance, whether printer setting information sent by a host device can be written into the memory 1 as setting information of the printer b-1. The operator of the printer b-1 uses this switch to allow the host device to write setting information in the printer b-1, or prevent the host device from writing setting information in the printer b-1.

The decision unit 3 decides, according to the state of the setting switch 2, whether the printer b-1 should respond to a query from a host device inquiring whether printer setting information can be accepted. The host device normally broadcasts this query on the network. When the broadcast query is received, if the setting switch 2 is turned on and the information (s1) output by the setting switch 2 is '1', the decision unit 3 decides that a response is necessary; if the setting switch 2 is turned off and the information (s1) output by the setting switch 2 is '0', the decision unit 3 decides that a response is unnecessary. Alternatively, '0' (off) may indicate that a response is necessary and '1' (on) may indicate that a response is unnecessary.

The response unit 4 responds to the host device according to the decision (s3) of the decision unit 3. When the query inquiring whether printer setting information can be accepted is received from the host device, if the decision unit 3 decides that a response is necessary, the response unit 4 sends response information (s4) back to the host device through the communication unit 5; if the decision unit 3 decides that a response is unnecessary, the response unit 4 ignores the broadcast query.

The communication unit 5 receives, from the network c, the broadcast query and information addressed specifically to the printer b-1; the communication unit 5 sends, to the network c, response information (s4) and other information that the printer b-1 sends to the host device.

The printer control unit 6 is a central processing unit (CPU) that controls the printer b-1. In the first embodiment, the printer control unit 6 controls the setting switch 2, decision unit 3, response unit 4, and communication unit 5, and executes a software module, more specifically a setting information writer 6-1, that writes the printer setting information received from the host device a-1 in the memory 1. The setting information writer 6-1 comprises a computer readable program stored in a read-only memory (ROM) (not shown) in the printer b-1.

Figure 3:
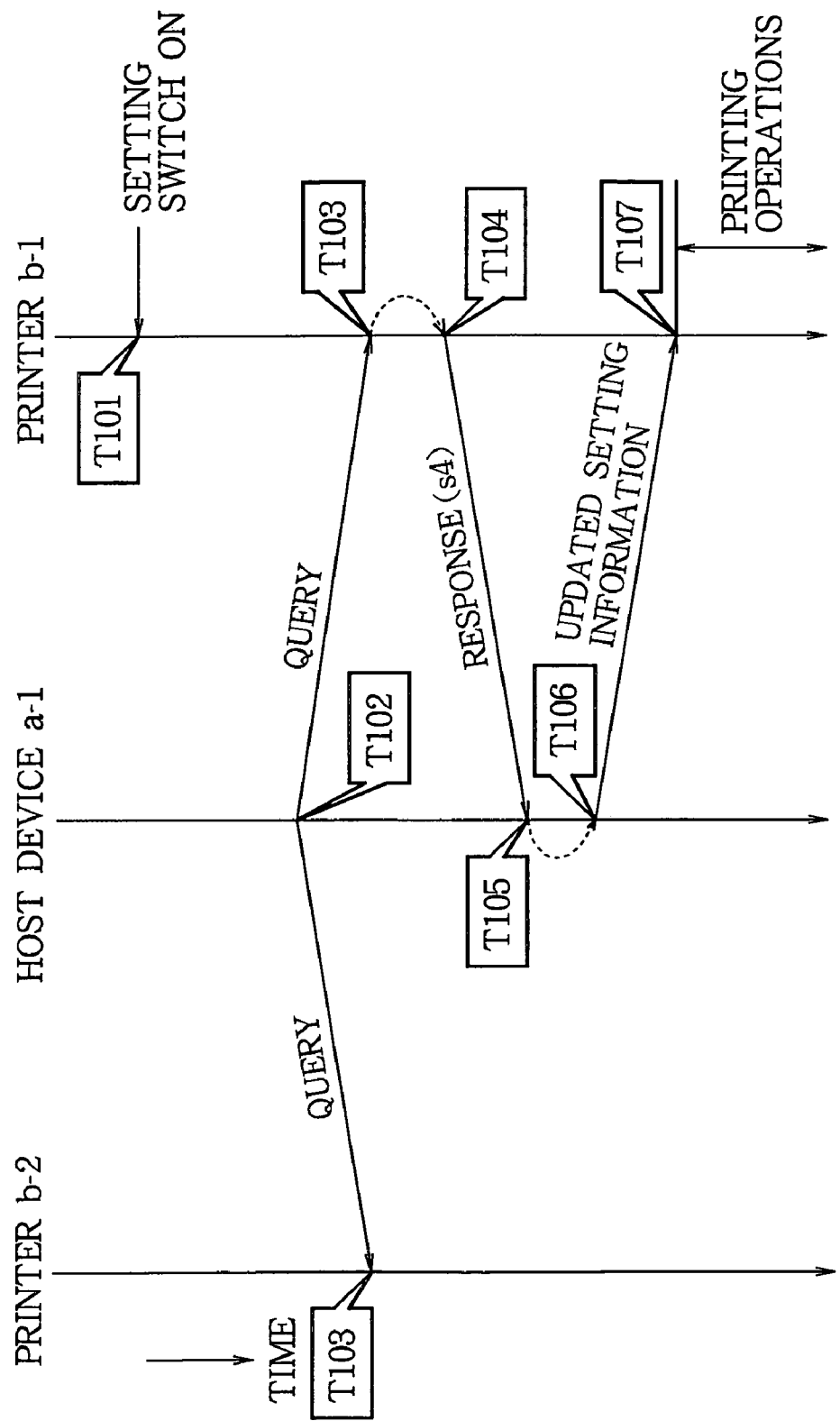
FIG. 3 is a communication sequence diagram illustrating the operation of the first embodiment.

Next, the operation of the printing system in the first embodiment will be described. The communication sequence among the host device a-1, the printer b-1, and another printer b-2 of the invented type is illustrated in FIG. 3, in which the vertical arrows indicate time.

At time T101, the setting switch 2 (in FIG. 2) of printer b-1 is turned on. Printer b-1 uses this switch to indicate, in advance, that printer setting information can be, accepted from a host device. The setting switch of printer b-2 (in FIG. 1) still remains off.

At time T102, host device a-1 (FIG. 1) broadcasts a query on the network c, asking for replies from all network terminal devices indicating whether or not printing conditions and other conditions can be set or updated. Although many network terminal devices may be connected to the network c, as indicated in FIG. 1, only printers b-1 and b-2 are shown in FIG. 3.

At time T103, printers b-1 and b-2 receive this query.

At time T104, since the setting switch in printer b-1 (FIG. 2) is turned on, after internal processing, printer b-1 sends the host device a-1 response information (s4) indicating that printer setting information can be accepted. This response information (s4) includes information identifying the printer b-1, and other information.

Since the setting switch in printer b-2 (FIG. 1) still remains off, printer b-2 ignores the broadcast query.

At time T105, the host device a-1 receives the response information (s4) from printer b-1 indicating that printer setting information can be accepted, and performs internal processing according to a predetermined program. In this processing, the host device a-1 ignores terminal devices (including printer b-2), from which it does not receive responses.

At time T106, the host device a-1 sends printer setting information only to printer b-1, since this is the only printer set to the state that enables the printer setting information to be received.

At time T107, the printer b-1 receives the printer setting information and writes the received printer setting information as its own setting information in its memory 1. The printer b-1 then operates according to this printer setting information.

Figure 4:
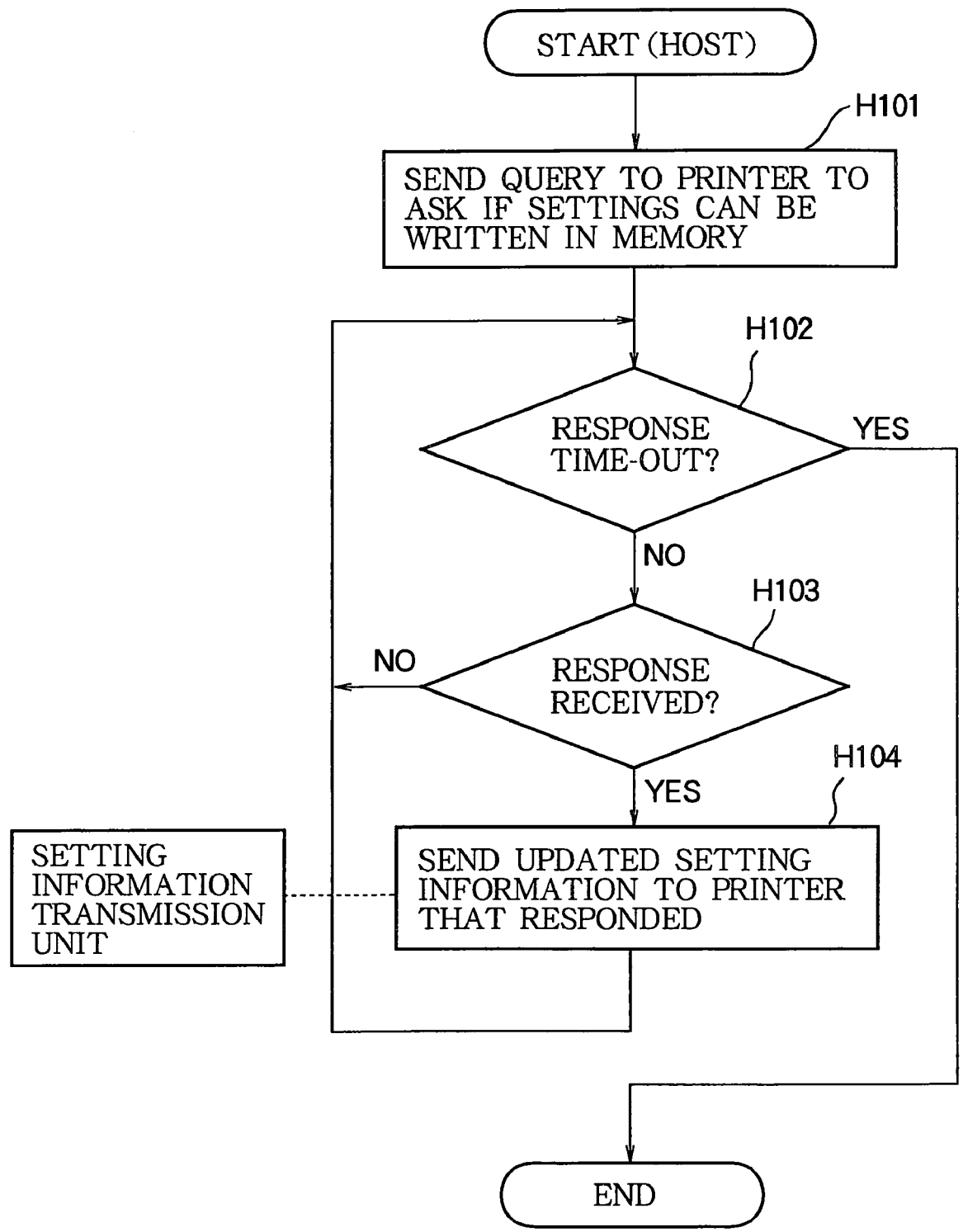
FIG. 4 is a flowchart illustrating the operation of the host device in the first embodiment.
Figure 5:
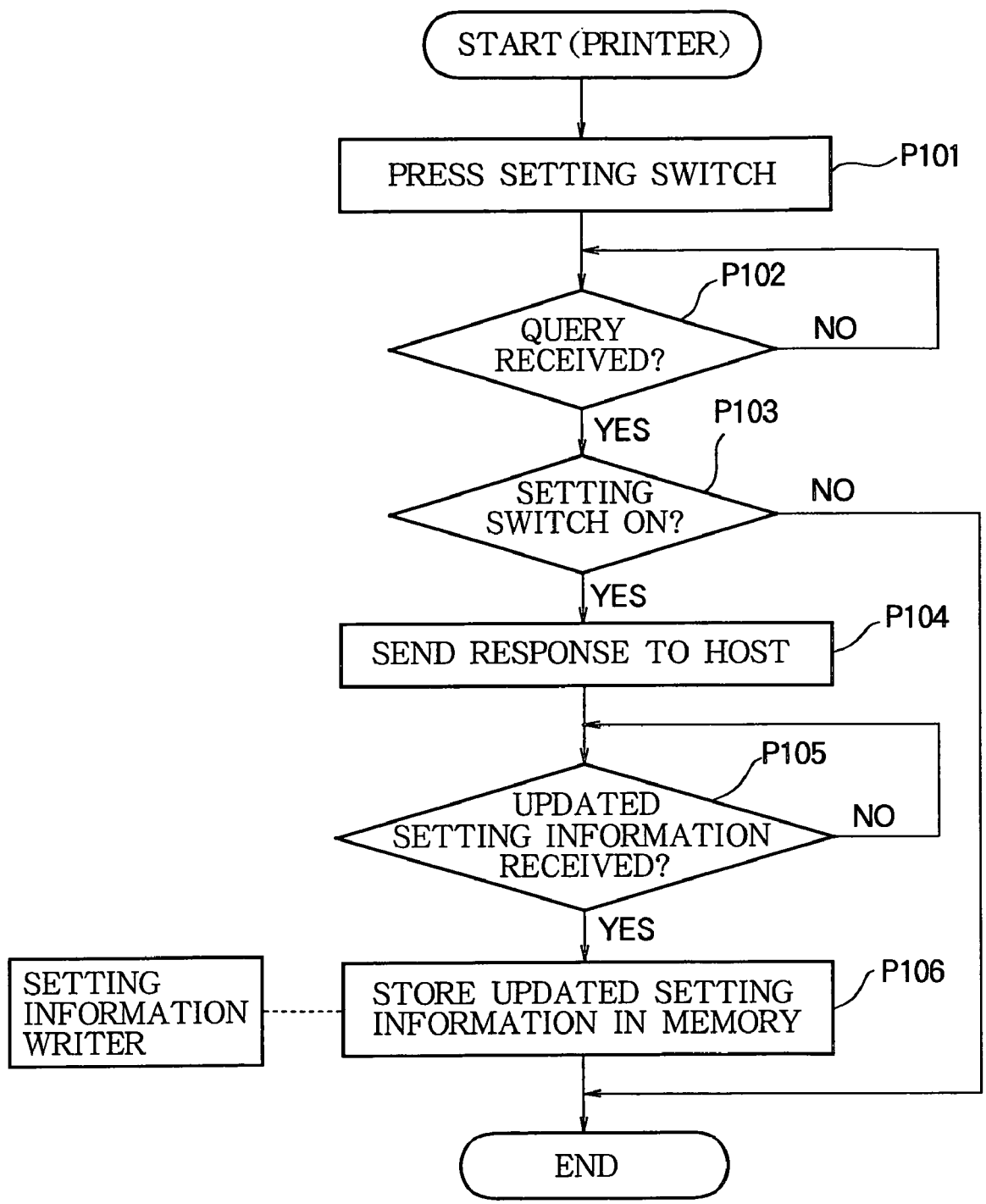
FIG. 5 is a flowchart illustrating the operation of the printer in the first embodiment.

The operation illustrated in the communication sequence drawing above will now be described with reference to flowcharts showing the operation of the host device a-1 (FIG. 4) and the printer b-1 (FIG. 5).

In step H101 in FIG. 4, the host device a-1 broadcasts a query on the network c (FIG. 1), asking for replies from all network terminal devices that can accept printer setting information.

In steps H102 and H103, after broadcasting the query, the host device a-1 waits for a predetermined time to receive a response. In step H102, the host device a-1 terminates the processing flow if the predetermined time has elapsed, that is, if a time-out has occurred, and otherwise proceeds to step H103. From step H103, the host device a-1 returns to step H102 if the response has not been received, and proceeds to step H104 if the response has been received.

In step H104, the host device a-1 sends printer setting information to the printer b-1 that responded to the host query, then returns to step H102 and repeats steps H102-H104. There may accordingly be cases in which the host device a-1 sends printer setting information to two or more printers within the predetermined time before a time-out occurs and the processing flow ends.

In step P101 in FIG. 5, the setting switch 2 (FIG. 2) of the printer b-1 is turned on by being pressed by the operator. The printer b-1 uses this switch to indicate, in advance, that printer setting information can be accepted from host device a-1 (or any other host device) and written in the memory 1.

In step P102, the communication unit 5 waits for a query from a host device. When the communication unit 5 receives the query and sends the corresponding information (s2) to the decision unit 3, the operation proceeds to step P103.

In step P103, the decision unit 3 decides whether or not to respond to the information (s2), according to the information (s1) output by the setting switch 2. If the information (s1) is '1', printer setting information can be accepted, so the decision unit 3 outputs a decision (s3) enabling the response to be made, and the operation proceeds to step P104; if the information (s1) is '0', printer setting information cannot be accepted, so the decision unit 3 outputs a decision (s3) disabling the response, and the processing flow ends.

In step P104, since the decision (s3) is to enable the response, the response unit 4 sends response information (s4) to the communication unit 5. The communication unit 5 returns the response information (s4) to the host device through the network c.

In step P105, the communication unit 5 waits to receive printer setting information from the host device. When the communication unit 5 receives printer setting information, the operation proceeds to step P106.

In step P106, the printer control unit 6 receives the information (s5) output from the communication unit 5, and writes the received information in the memory 1 as new setting information or updated setting information, replacing existing printer setting information. The printer b-1 then operates according to this printer setting information.

As described above, according to the first embodiment, since the setting switch 2 is provided in the printer b-1, the decision unit 3 decides, according to the information (s1) indicating that the setting switch 2 is on or off, whether the printer b-1 should respond to a query from a host device inquiring whether or not printer setting information can be written in the memory 1, and the printer b-1 replies to the query only if a response is necessary. As a result, the printer in which setting conditions should be set or updated can be identified accurately.

In the description above, although the decision unit 3 and the response unit 4 are shown as dedicated hardware blocks, the invention is not restricted to the use of dedicated hardware. More specifically, the decision unit 3, the response unit 4, or both the decision unit 3 and the response unit 4 may be subsumed within the printer control unit 6, by providing suitable computer readable programs executed by the printer control unit 6.

Second Embodiment

Figure 6:
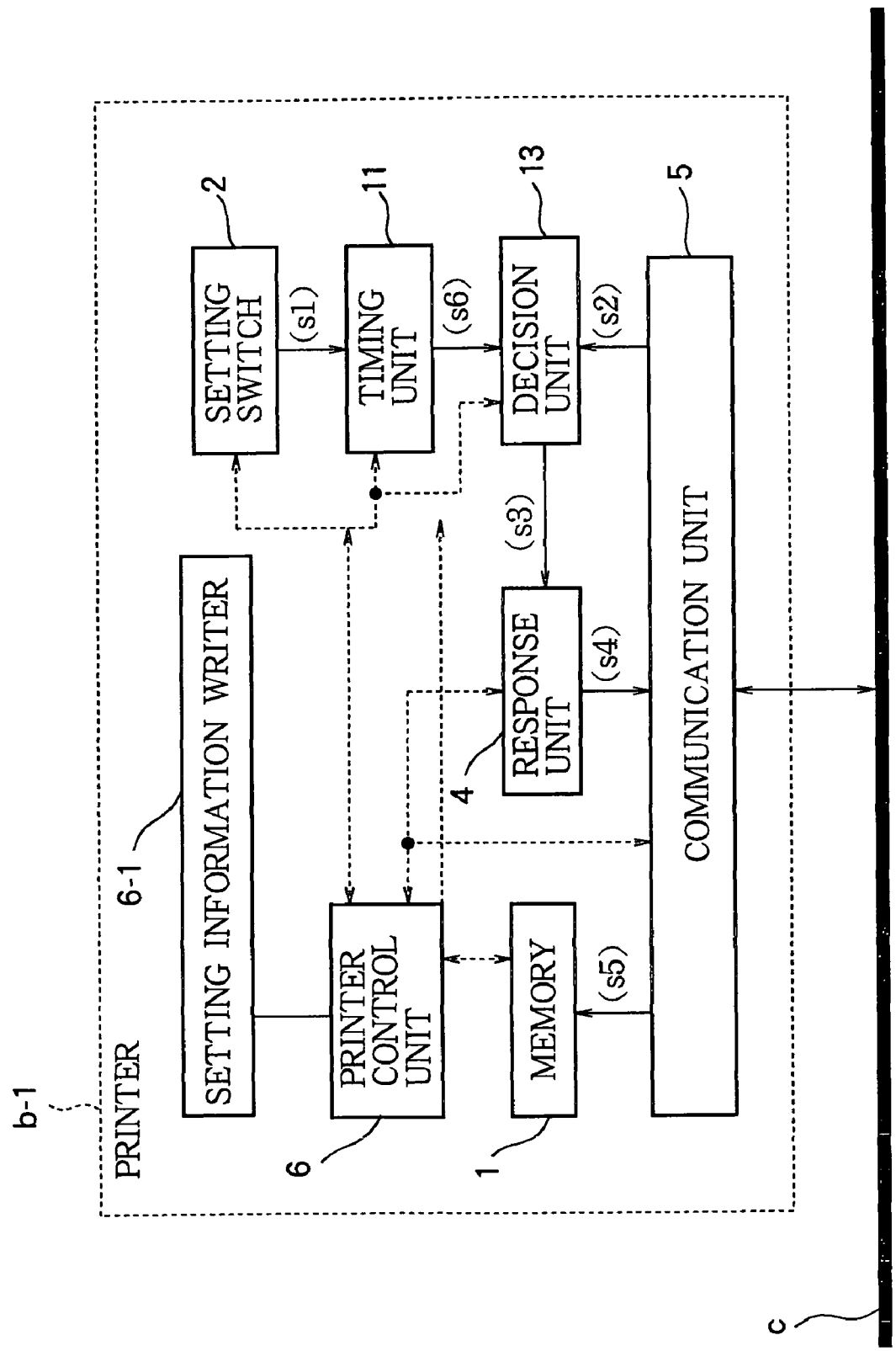
FIG. 6 is a block diagram of a printer according to a second embodiment of the invention.

Referring to FIG. 6, a printer according to a second embodiment of the invention differs from the printer according to the first embodiment by including a timing unit 11 and a different decision unit 13.

The timing unit 11 measures a time interval that starts when the setting switch 2 is turned on. More specifically, when the information (s1) output from the setting switch 2 is set to '1', the timing unit 11 starts counting time and sets its own output information (s6) to '1'; when a time interval of a predetermined length has elapsed, the timing unit 11 stops counting time and sets its output information (s6) to '0'.

The decision unit 13 decides, according to the state of the setting switch 2 and the elapsed time measured by the timing unit 11, whether the printer b-1 should respond to a query from a host device inquiring whether printer setting information can be accepted. More specifically, if the query is received from the host device while the timing unit 11 is counting time, that is, when the information (s6) output by the timing unit 11 is '1', the decision unit 13 decides that a response is necessary and outputs a decision (s3) enabling the response to be made; if the query is received when the timing unit 11 has stopped counting time and its output information (s6) is '0', the decision unit 13 decides that a response is unnecessary and outputs a decision (s3) disabling the response.

Since the other constituent elements in the second embodiment are the same as in the first embodiment, descriptions thereof will be omitted.

Figure 7:
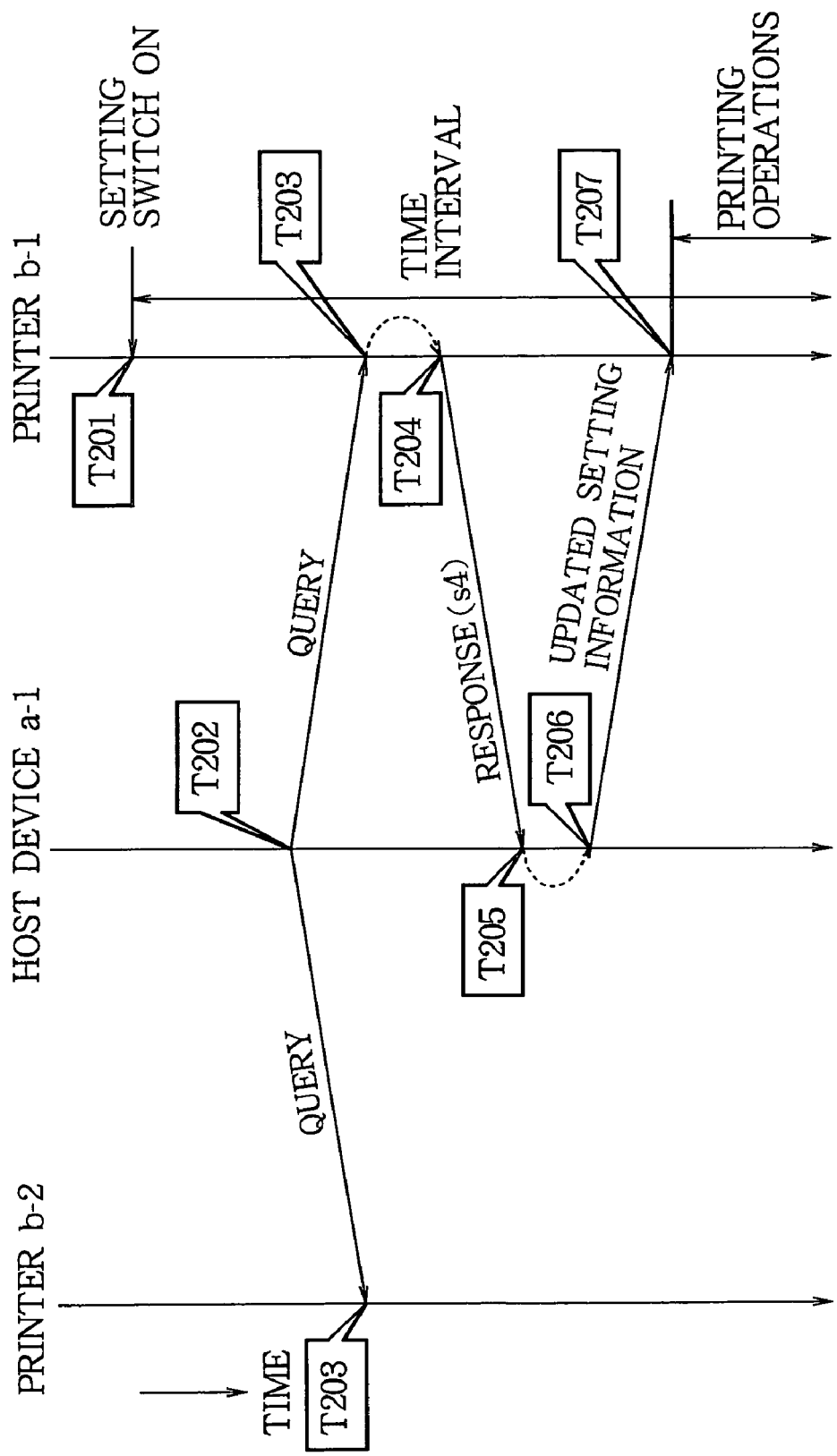
FIG. 7 is a communication sequence diagram illustrating the operation of the second embodiment when the printer succeeds in accepting printer setting information.

Next, the operation of the printing system in the second embodiment will be described. The communication sequence among host device a-1 and printers b-1 and b-2 when printer b-1 succeeds in accepting printer setting information is illustrated in FIG. 7, in which the vertical arrows indicate time.

At time T201, the setting switch 2 (FIG. 6) of printer b-1 is turned on. The printer b-1 uses this switch to indicate, in advance, that printer setting information can be accepted from a host device. The timing unit 11 starts measuring elapsed time from time T201. The setting switch of printer b-2 (FIG. 1) still remains off.

At time T202, host device a-1 (FIG. 1) broadcasts a query on the network c, asking for replies from all network terminal devices indicating whether or not printing conditions and other conditions can be set or updated. This query reaches many network terminal devices connected to the network c, although only printers b-1 and b-2 are shown in FIG. 7.

At time T203, printers b-1 and b-2 receive this query.

At time T204, since the setting switch in printer b-1 is turned on and the length of the time interval between time T201 and time T204 is shorter than a predetermined length, after internal processing, printer b-1 sends host device a-1 response information (s4) indicating that printer setting information can be accepted. This response information (s4) includes an IP number identifying the printer b-1, and other information.

Since the setting switch in printer b-2 still remains off, printer b-2 ignores the broadcast query.

At time T205, the host device a-1 receives the response information (s4) from printer b-1 indicating that printer setting information can be accepted, and performs internal processing according to a predetermined program. In this processing, the host device a-1 recognizes that it cannot set or update printing conditions in terminal devices (including printer b-2) from which it does not receive responses.

At time T206, the host device a-1 sends printer setting information only to printer b-1, since this is the only printer set to the state that enables the printer setting information to be received.

At time T207, when the printer b-1 receives the printer setting information, since the length of the interval from time T201 to time T207 is shorter than the predetermined length, the printer b-1 writes the received printer setting information as its own setting information in the memory 1. The printer b-1 then operates according to this printer setting information.

Figure 8:
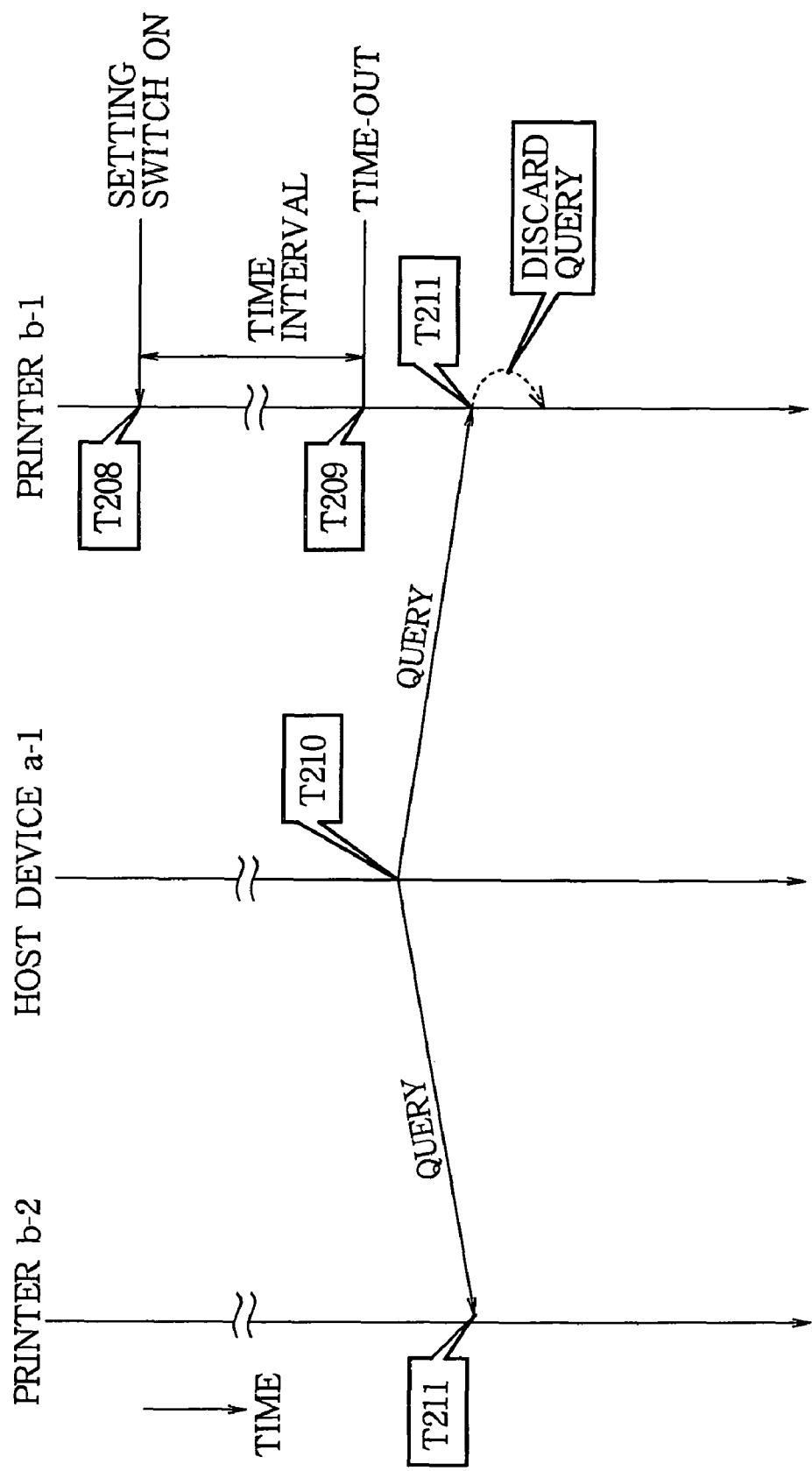
FIG. 8 is a communication sequence diagram illustrating the operation of the second embodiment when the printer fails to accept printer setting information.

The communication sequence among the host device a-1 and printers b-1 and b-2 when printer b-1 fails to accept printer setting information is illustrated in FIG. 8. The vertical arrows again indicate time.

At time T208, the setting switch 2 (FIG. 6) of printer b-1 is turned on. The printer b-1 uses this switch to indicate, in advance, that printer setting information can be accepted from a host device. The timing unit 11 then starts measuring the length of the time interval from time T208. The setting switch of printer b-2 still remains off.

At time T209, the time interval that started when the setting switch 2 was turned on at time T208 reaches the predetermined length; that is, a time-out occurs.

At time T210, host device a-1 (FIG. 1) broadcasts a query on the network c, asking for replies from all network terminal devices indicating whether or not printing conditions and other conditions can be set or updated. This query reaches many network terminal devices connected to the network c, although only printers b-1 and b-2 are shown in FIG. 8.

At time T211, printers b-1 and b-2 receive this query.

Although the setting switch in printer b-1 is turned on, since the length of the interval from time T208 to time T211 is greater than the predetermined length, printer b-1 ignores the broadcast query, and continues to operate according to its existing (non-updated) setting information.

Since the setting switch in printer b-2 still remains off, printer b-2 also ignores the broadcast query.

The operation illustrated in the communication sequence drawings above will now be described with reference to a flowchart showing the operation of printer b-1 (FIG. 6). Since the operation of the host device a-1 in the second embodiment is the same as in the first embodiment, a description will be omitted.

Figure 9:
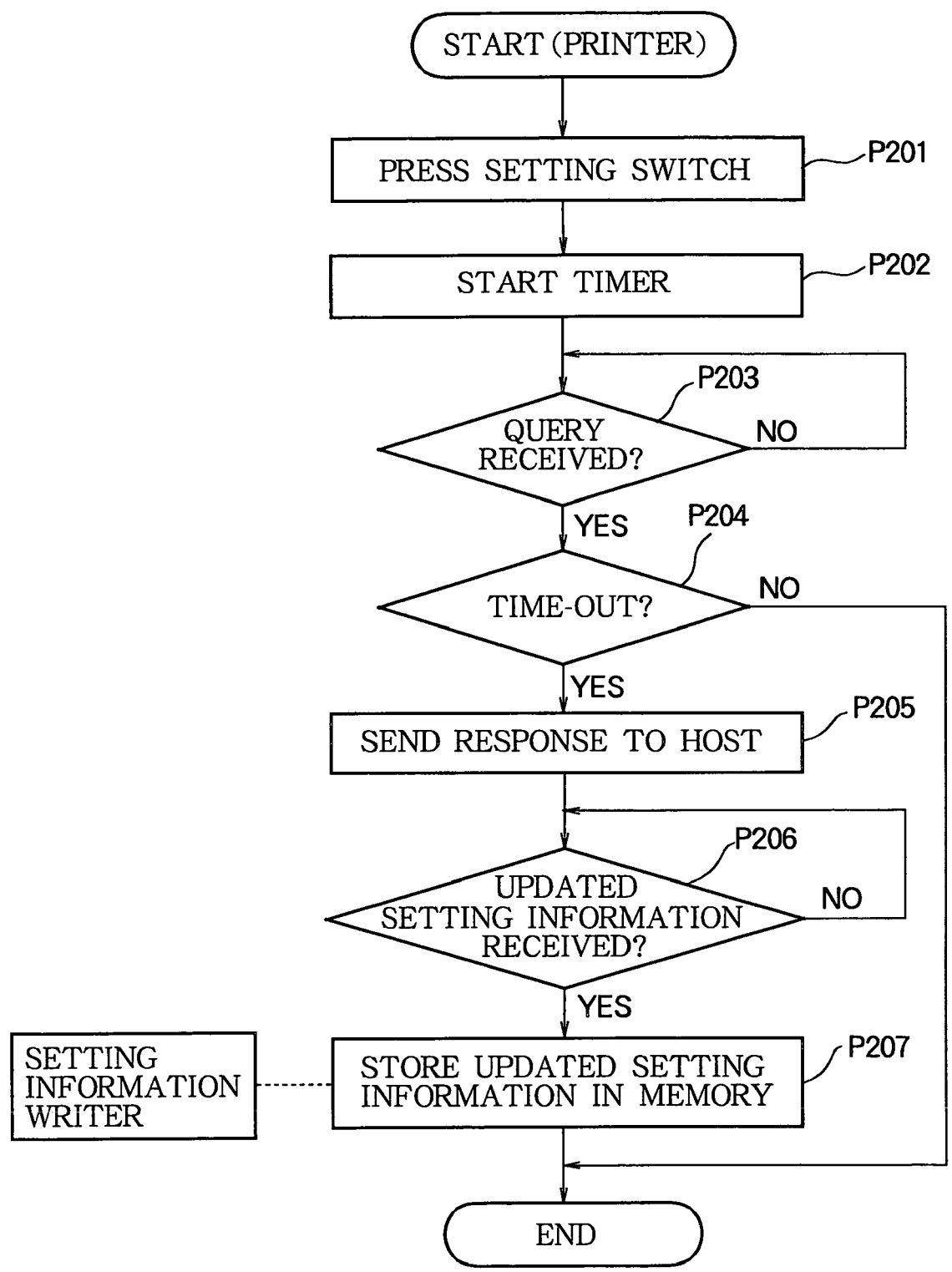
FIG. 9 is a flowchart illustrating the operation of the printer in the second embodiment.

In step P201 in FIG. 9, the setting switch 2 (FIG. 6) of the printer b-1 is turned on by being pressed by the operator. The printer b-1 uses this switch to indicate, in advance, that printer setting information can be accepted from a host device and written in the memory 1.

In step P202, since the setting switch 2 is turned on and the information (s1) output from the setting switch 2 is '1', the timing unit 11 starts counting time and sets its own output information (s6) to '1'.

In step P203, the communication unit 5 waits for a query from a host device. When the communication unit 5 receives the query and sends the corresponding information (s2) to the decision unit 13, the operation proceeds to step P204.

In step P204, the decision unit 13 decides whether or not to respond to the information (s2), according to the information (s6) output by the timing unit 11. If the information (s6) is '1', printer setting information can be accepted, so the decision unit 13 outputs a decision (s3) enabling the response to be made, and the operation proceeds to step P205; if the information (s6) is '0', printer setting information cannot be accepted, so the decision unit 13 outputs a decision (s3) disabling the response, and the processing flow ends.

In step P205, since the decision (s3) is to enable the response, the response unit 4 sends response information (s4) to the communication unit 5. The communication unit 5 returns the response information (s4) to the host device through the network c.

In step P206, the communication unit 5 waits to receive printer setting information from the host device a-1. When the communication unit 5 receives printer setting information, the operation proceeds to step P207.

In step P207, the printer control unit 6 receives the information (s5) output from the communication unit 5, and writes the received information in the memory 1 as new setting information. The printer control unit 6 then operates according to this printer setting information.

As described above, according to the second embodiment, since the timing unit 11 is provided in the printer b-1, and a response (s4) to a query from the host device a-1 inquiring whether or not printer setting information can be written in the memory 1 is returned only if the information (s6) output from the timing unit 11 is '1', the interval during which printer setting information is accepted from the host device a-1 can be limited. As a result, a limit can be imposed on the interval during which the printer setup processing can be performed, instead of letting the interval continue indefinitely.

In the description above, although the decision unit 13 and the response unit 4 are shown as dedicated hardware blocks, the invention is not restricted to the use of dedicated hardware. More specifically, the decision unit 13, the response unit 4, or both the decision unit 13 and the response unit 4 may be subsumed within the printer control unit 6, by providing suitable computer readable programs executed by the printer control unit 6.

Third Embodiment

Figure 10:
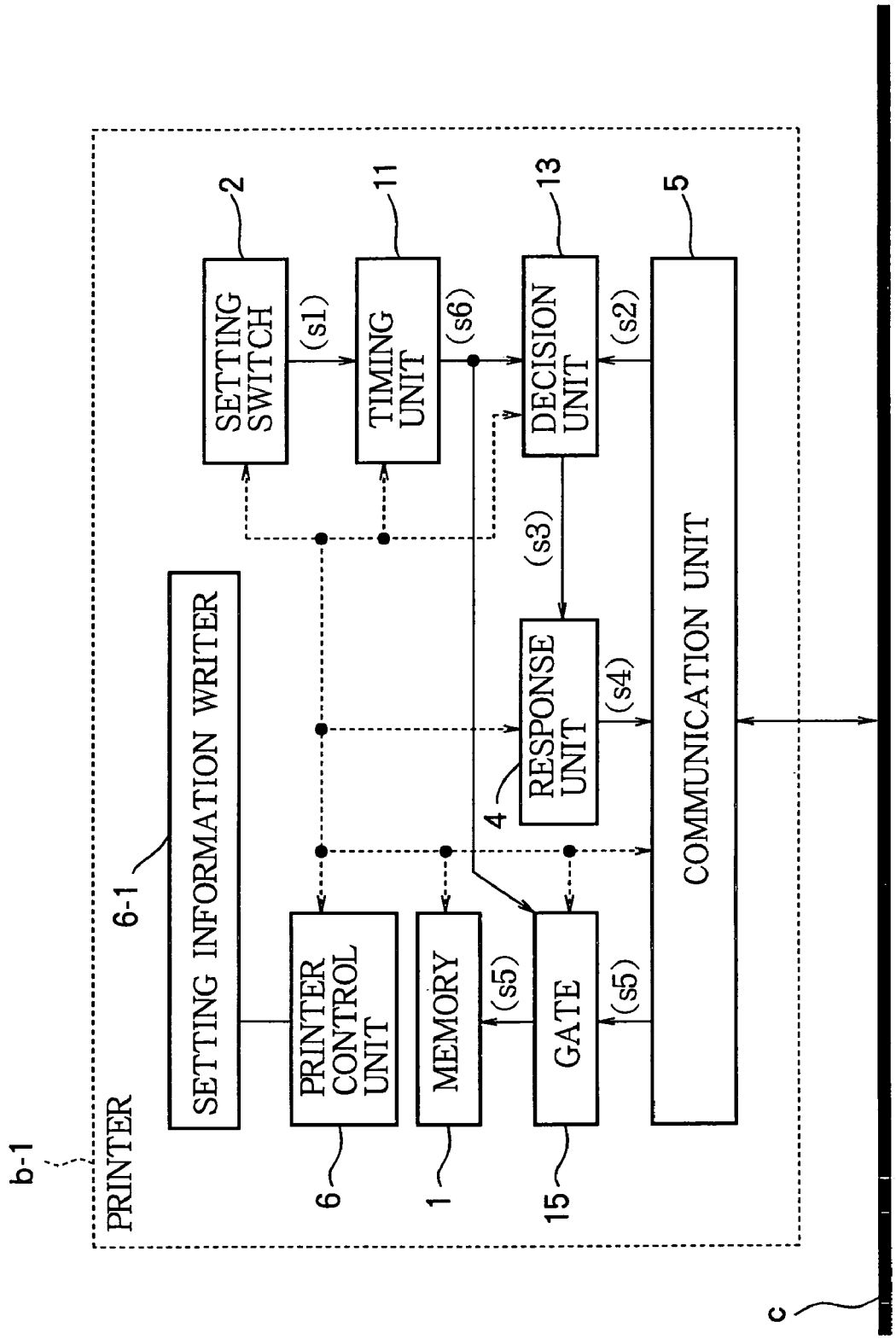
FIG. 10 is a block diagram of a printer according to a third embodiment of the invention.

Referring to FIG. 10, a printer according to a third embodiment of the invention differs from the printer according to the second embodiment by including a gate 15.

The gate 15 inhibits writing of printer setting information received from a host device in the memory 1, according to the state of the setting switch 2 and the elapsed time measured by the timing unit 11. More specifically, the gate 15 allows printer setting information received from the host device to be written in the memory 1 while the timing unit 11 is counting time, that is, when the information (s6) output by the timing unit 11 is '1'; the gate 15 inhibits writing of printer setting information received from the host device in the memory 1 when the timing unit 11 has stopped counting time and its output information (s6) is '0'.

Since the other constituent elements in the third embodiment are the same as in the second embodiment, descriptions of them will be omitted.

Figure 11:
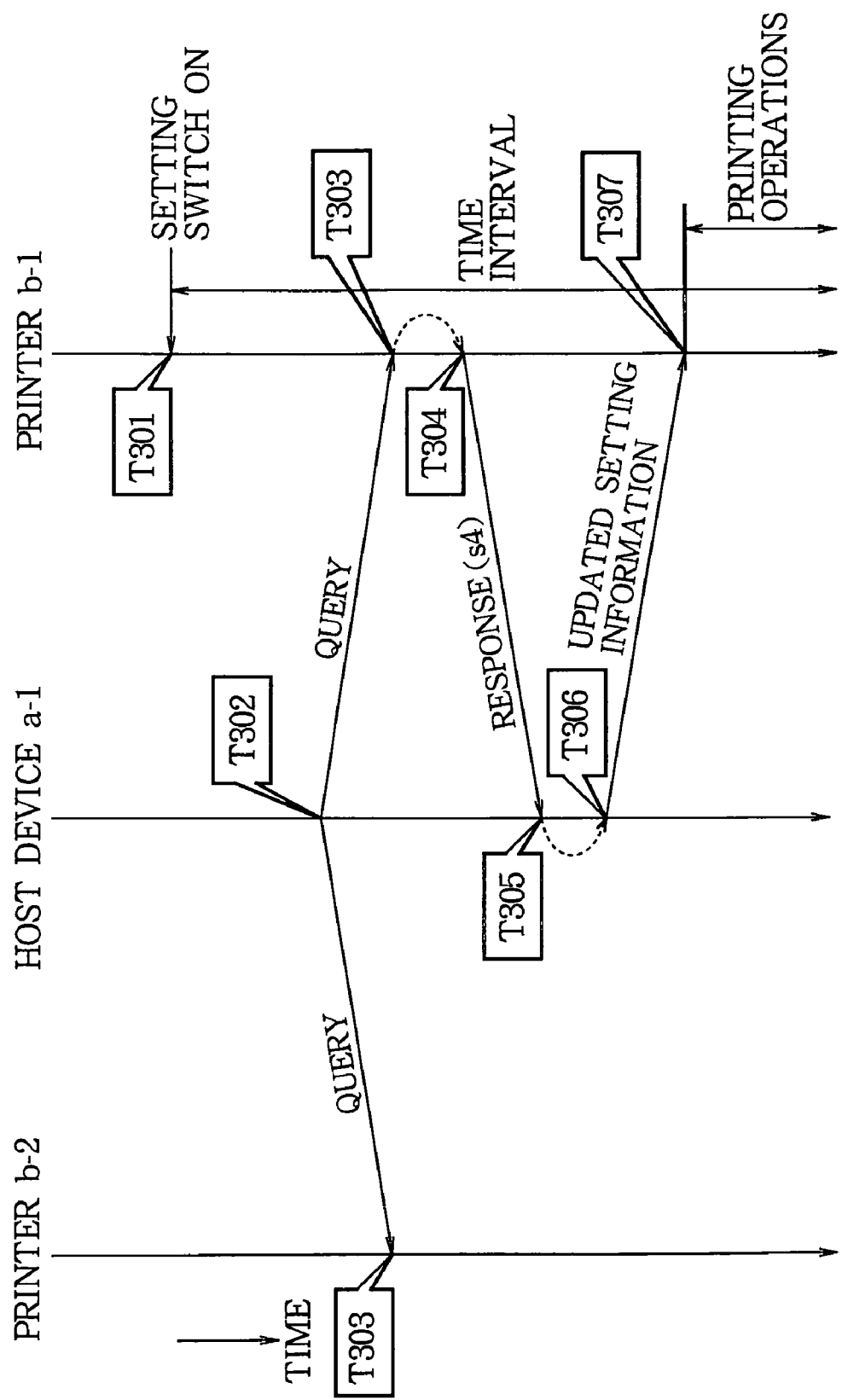
FIG. 11 is a communication sequence diagram illustrating the operation of the third embodiment when the printer succeeds in accepting printer setting information.

Next, the operation of the printing system in the third embodiment will be described. The communication sequence among host device a-1 and printers b-1 and b-2 when printer b-1 succeeds in accepting printer setting information is illustrated in FIG. 11, in which the vertical arrows indicate time.

At time T301, the setting switch 2 (FIG. 10) of printer b-1 is turned on. Printer b-1 uses this switch to indicate, in advance, that printer setting information can be accepted from a host device. The timing unit 11 starts measuring elapsed time from time T301. The setting switch of printer b-2 still remains off.

At time T302, host device a-1 (FIG. 1) broadcasts a query on the network c, asking for replies from all network terminal devices indicating whether or not printing conditions and other conditions can be set or updated. This query reaches many network terminal devices connected to the network c, although only printers b-1 and b-2 are shown in FIG. 11.

At time T303, printers b-1 and b-2 receive this query.

At time T304, since the setting switch in printer b-1 is turned on and the length of the time interval between time T301 and time T304 is shorter than a predetermined length, after internal processing, printer b-1 sends the host device a-1 response information (s4) indicating that printer setting information can be accepted. This response information (s4) includes an IP number identifying printer b-1, and other information.

Since the setting switch in printer b-2 still remains off, printer b-2 ignores the broadcast query.

At time T305, the host device a-1 receives the response information (s4) from printer b-1 indicating that printer setting information can be accepted, and performs internal processing according to a predetermined program. In this processing, the host device a-1 recognizes that it cannot set or update printing conditions in terminal devices (including printer b-2) from which it does not receive responses.

At time T306, the host device a-1 sends printer setting information only to printer b-1, since this is the only printer set to the state that enables the printer setting information to be received.

At time T307, when printer b-1 receives the printer setting information, since the length of the interval from time T301 to time T307 is shorter than the predetermined length, printer b-1 writes the received printer setting information as its own setting information in the memory 1. Printer b-1 then operates according to this printer setting information.

Figure 12:
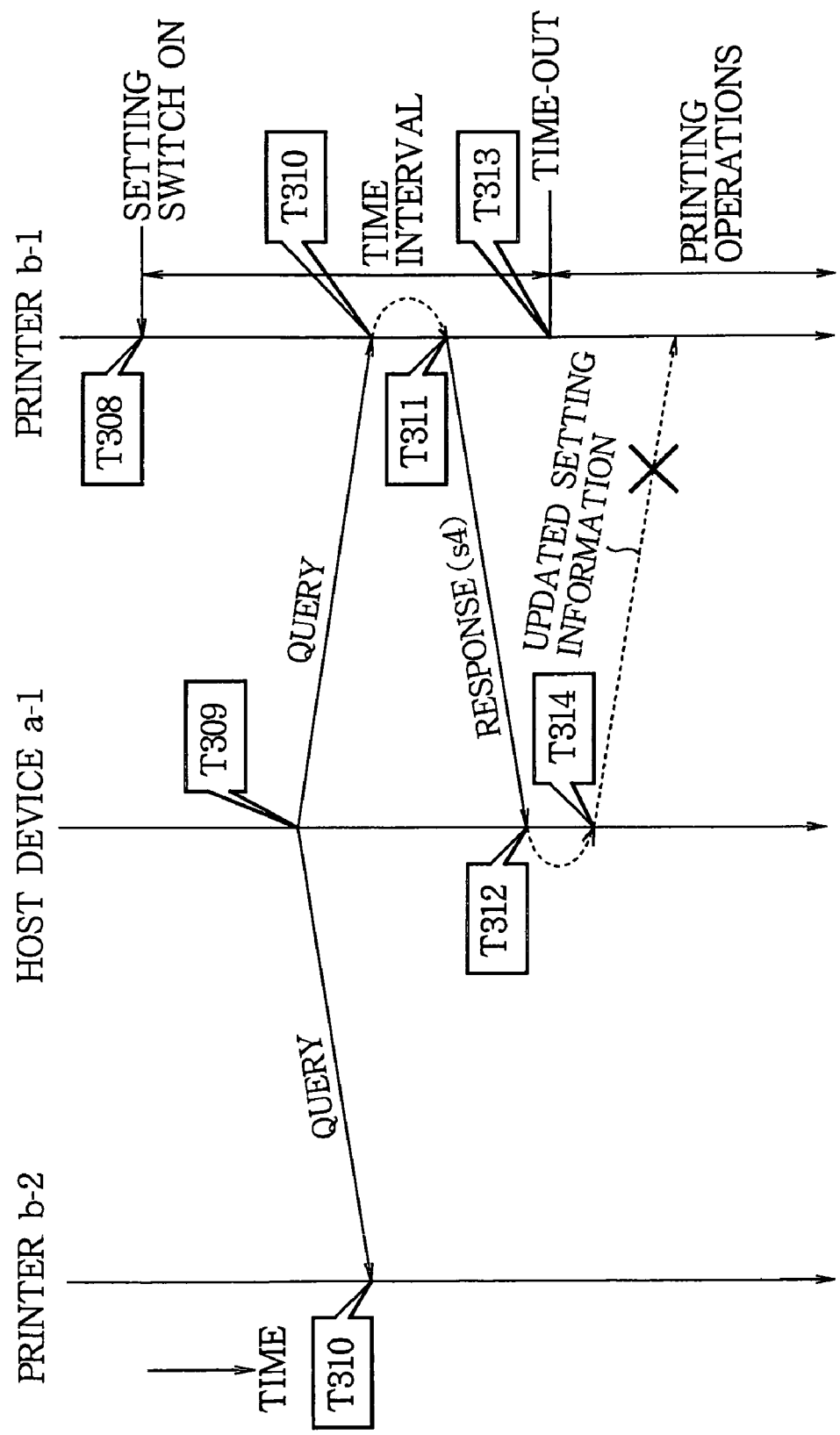
FIG. 12 is a communication sequence diagram illustrating the operation of the third embodiment when the printer fails to accept printer setting information.

The communication sequence among the host device a-1 and printers b-1 and b-2 when printer b-1 fails to accept printer setting information is illustrated in FIG. 12. The vertical arrows again indicate time.

At time T308, the setting switch 2 (FIG. 10) of printer b-1 is turned on. Printer b-1 uses this switch to indicate, in advance, that printer setting information can be accepted from a host device. The timing unit 11 then starts measuring the length of the time interval from time T308. The setting switch of printer b-2 still remains off.

At time T309, host device a-1 (FIG. 1) broadcasts a query on the network c, asking for replies from all network terminal devices indicating whether or not printing conditions and other conditions can be set or updated. This query reaches many network terminal devices connected to the network c, although only printers b-1 and b-2 are shown in FIG. 12.

At time T310, printers b-1 and b-2 receive this query.

At time T311, since the setting switch in the printer b-1 is turned on and the length of the time interval between time T301 and time T311 is shorter than a predetermined length, after internal processing, the printer b-1 sends the host device a-1 response information (s4) indicating that printer setting information can be accepted. This response information (s4) includes an IP number identifying the printer b-1, and other information.

Since the setting switch in printer b-2 still remains off, printer b-2 ignores the broadcast query.

At time T312, the host device a-1 receives the response information (s4) from printer b-1 indicating that printer setting information can be accepted, and performs internal processing according to a predetermined program. In this processing, the host device a-1 recognizes that it cannot set or update printing conditions in terminal devices (including printer b-2) from which it does not receive responses.

At time T313, the time interval that started when the setting switch 2 was turned on at time T308 reaches the predetermined length; that is, a time-out occurs.

At time T314, the host device a-1 sends printer setting information only to printer b-1, since this is the only printer set to the state that enables the printer setting information to be received. The gate 15 (FIG. 10), however, inhibits writing of the information (s5) received from the communication unit 5 in the memory 1. The printer b-1 then operates according to its existing (non-updated) setting information.

The operation illustrated in the communication sequence drawings above will now be described with reference to a flowchart showing the operation of the printer b-1. Since the operation of the host device a-1 in the third embodiment is the same as in the first embodiment, a description will be omitted.

Figure 13:
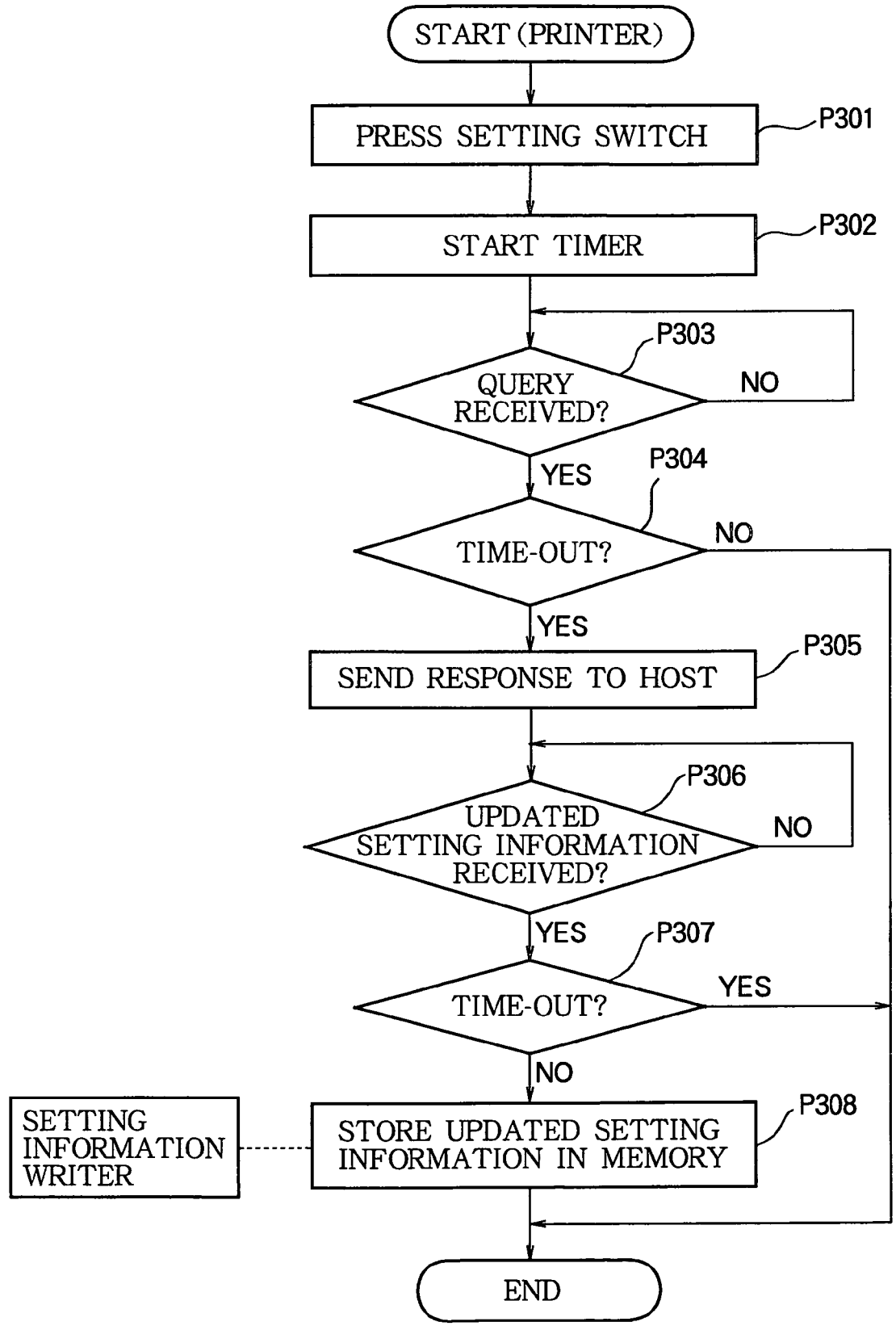
FIG. 13 is a flowchart illustrating the operation of the printer in the third embodiment.

In step P301 in FIG. 13, the setting switch 2 (FIG. 10) of the printer b-1 is turned on by being pressed by the operator. The printer b-1 uses this switch to indicate, in advance, that printer setting information can be accepted from a host device and written in the memory 1.

In step P302, since the setting switch 2 is turned on and the information (s1) output from the setting switch 2 is '1', the timing unit 11 starts counting time and sets its own output information (s6) to '1'.

In step P303, the communication unit 5 waits for a query from a host device. When the communication unit 5 receives the query and sends the corresponding information (s2) to the decision unit 13, the operation proceeds to step P304.

In step P304, the decision unit 13 decides whether or not to respond to the information (s2), according to the information (s6) output by the timing unit 11. If the information (s6) is '1', printer setting information can be accepted, so the decision unit 13 outputs a decision (s3) enabling the response to be made, and the operation proceeds to step P305; if the information (s6) is '0', printer setting information cannot be accepted, so the decision unit 13 outputs a decision (s3) disabling the response, and the processing flow ends.

In step P305, since the decision (s3) is to enable the response, the response unit 4 sends response information (s4) to the communication unit 5. The communication unit 5 returns the response information (s4) to the host device through the network c.

In step P306, the communication unit 5 waits to receive printer setting information from the host device. When the communication unit 5 receives printer setting information, the operation proceeds to step P307.

In step P307, the communication unit 5 receives printer setting information from the host device, and sends the gate 15 the received information. On receiving the information (s5) output from the communication unit 5, the gate 15 operates according to the information (s6) output from the timing unit 11: if the information (s6) is '1', the gate 15 sends valid information (s5) to the memory 1 (FIG. 10); if the information (s6) is '0', the gate 15 discards the information (s5) as invalid and the process ends.

In step P308, the setting information writer 6-1 (FIG. 10) of the printer control unit 6 writes the valid information (s5) received from the communication unit 5 in the memory 1 as new setting information. The printer b-1 then operates according to this printer setting information.

As described above, according to the third embodiment, since the gate 15 is provided in the printer b-1, and printer setting information from the host device a-1 can be written in the memory 1 only if the information (s6) output from the timing unit 11 is '1', the interval during which printer setting information is accepted from the host device a-1 can be limited. As a result, if the printer setup process is interrupted for some reason after the printer replies to the query inquiring whether or not printer setting information can be accepted but before the printer receives the setting information, the interrupted setup process has no effect on the subsequent processing.

In the description above, although the decision unit 13, the response unit 4, and the gate 15 are shown as dedicated hardware blocks, the invention is not restricted to the use of dedicated hardware. More specifically, the decision unit 13, the response unit 4, the gate 15, or all of them may be subsumed within the printer control unit 6, by providing suitable computer readable programs executed by the printer control unit 6.

Fourth Embodiment

Figure 14:
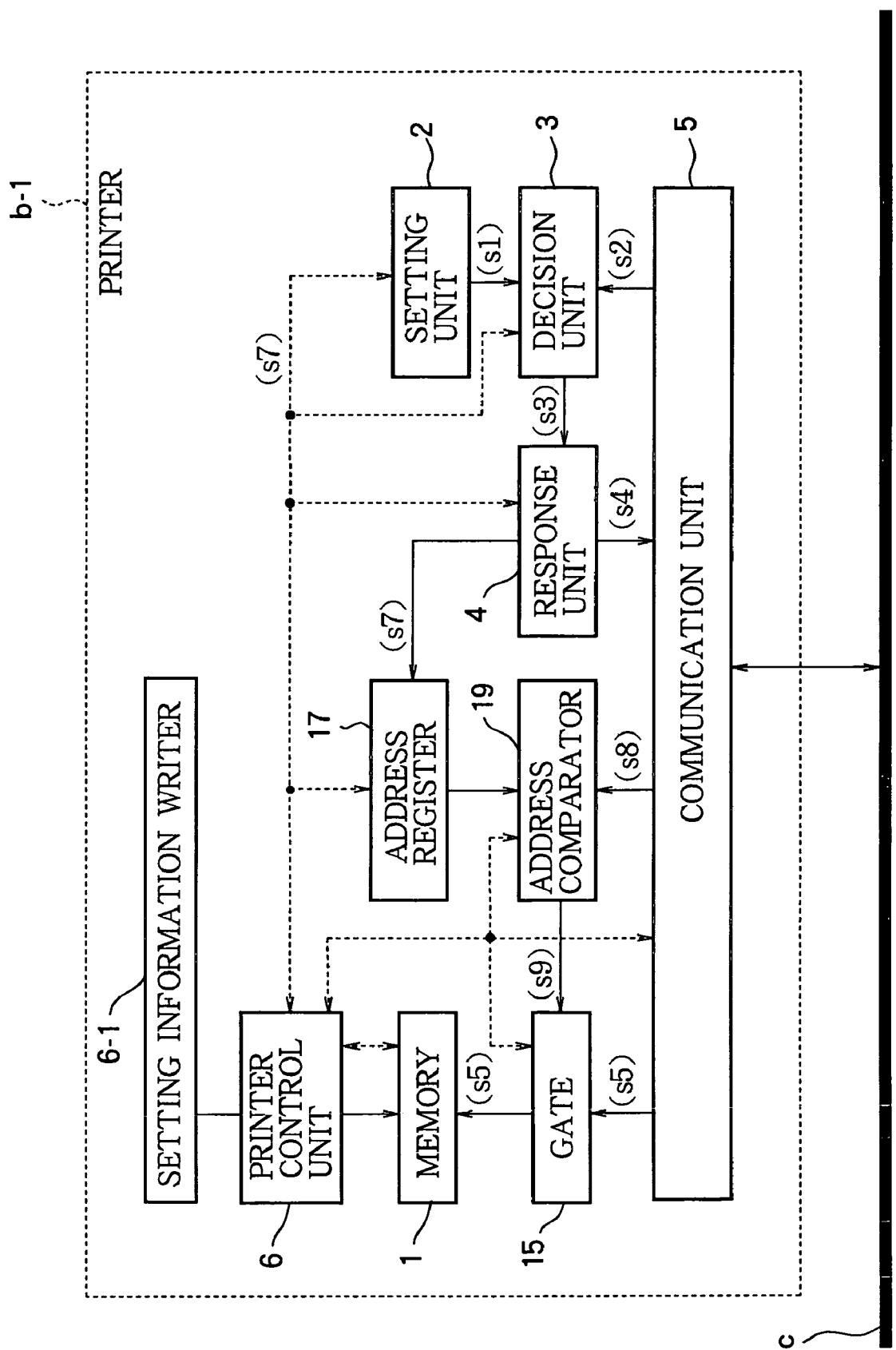
FIG. 14 is a block diagram of a printer according to a fourth embodiment of the invention.

Referring to FIG. 14, a printer according to a fourth embodiment of the invention comprises a memory 1, a setting switch 2, a decision unit 3, a response unit 4, a communication unit 5, a printer control unit 6, a gate 15, an address register 17, and an address comparator 19. The last two of these constituent elements will be described below.

The address register 17 is a memory that temporarily retains, as a destination address, an address identifying a host device (e.g., host device a-1 in FIG. 1) which sends a query inquiring whether or not printer setting information can be accepted and to which response information (s4) is sent.

The address comparator 19 compares the source address from which printer setting information originates with the destination address retained in the address register 17, and sends output information (s9) to the gate 15 only if the source address matches the destination address.

Since the other constituent elements in the fourth embodiment are the same as in the third embodiment, descriptions of them will be omitted.

Figure 15:
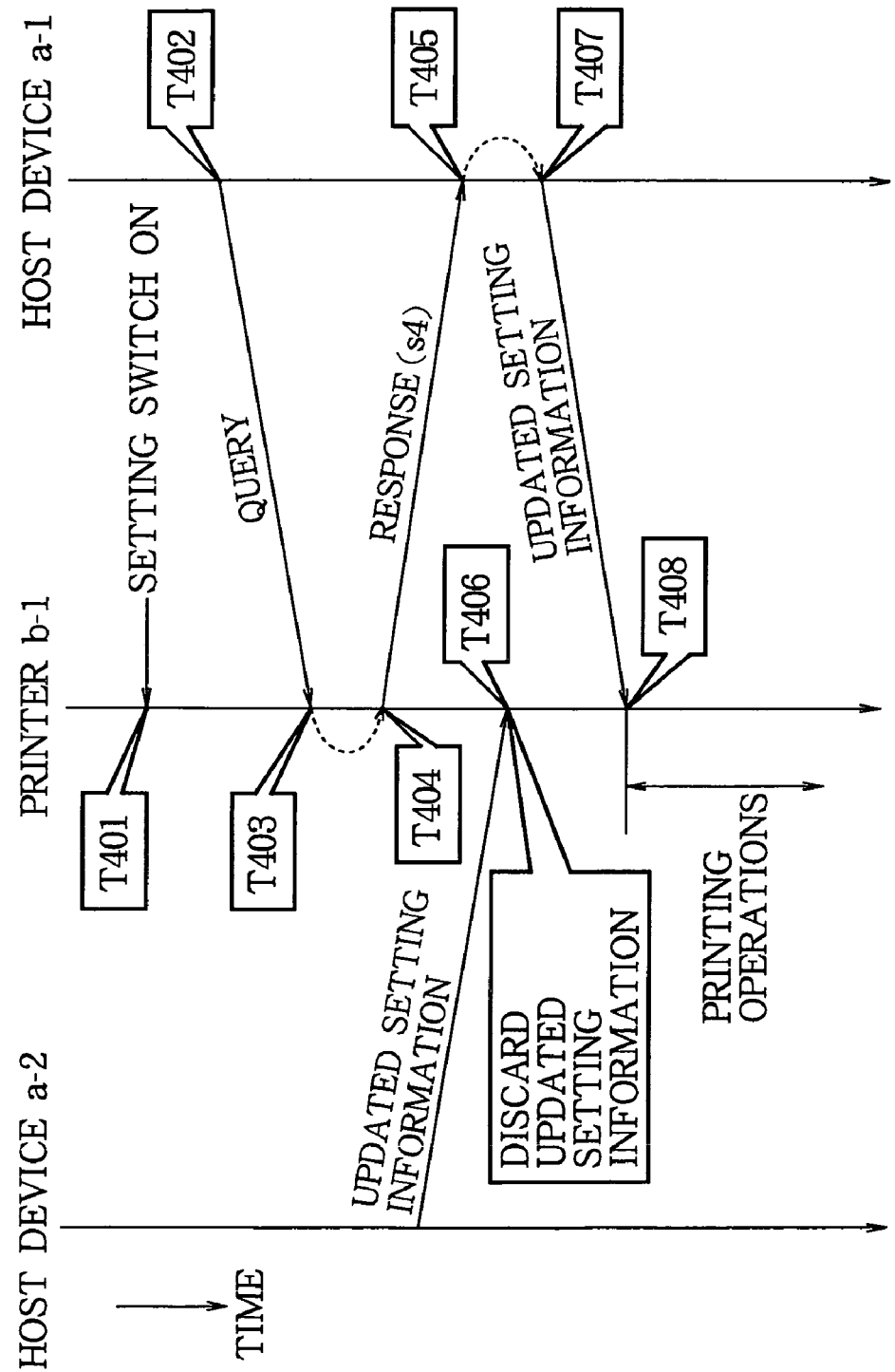
FIG. 15 is a communication sequence diagram illustrating the operation of the fourth embodiment.

Next, the operation of the printing system in the fourth embodiment will be described. The communication sequence among host devices a-1 and a-2 printer b-1 is illustrated in FIG. 15, in which the vertical arrows indicate time.

At time T401, the setting switch 2 (FIG. 14) of the printer b-1 is turned on. The printer b-1 uses this switch to indicate, in advance, that printer setting information can be accepted from a host device, e.g. host device a-1 or a-2 in FIG. 1.

At time T402, host device a-1 broadcasts a query on the network c, asking for replies from all network terminal devices indicating whether or not printing conditions and other conditions can be set or updated. This query reaches many network terminal devices connected to the network c, although only printer b-1 is shown in FIG. 15.

At time T403, the printer b-1 receives this query.

At time T404, since the setting switch in the printer b-1 is turned on, after internal processing, the printer b-1 sends host device a-1 response information (s4) indicating that printer setting information can be accepted. This response information (s4) includes an IP number identifying the printer b-1, and other information. The response unit 4 temporarily stores an address identifying the host device a-1, to which the response information (s4) is sent, in the address register 17 as a destination address (s7).

At time T405, host device a-1 receives the response information (s4) from the printer b-1 indicating that printer setting information can be accepted, and performs internal processing according to a predetermined program.

At time T406, the printer b-1 receives printer setting information from a host device a-2 differing from the host device a-1 that sent the query inquiring whether or not printing conditions and other conditions can be set or updated, and to which the response information (s4) has been sent. Since the source address identifying the host device a-2 sending the printer setting information differs from the destination address (s7) that is temporarily retained in the address register 17, the printer b-1 discards the printer setting information received from the host device a-2.

At time T407, host device a-1 sends printer setting information to printer b-1, since this is the only printer set to the state that enables the printer setting information to be received.

At time T408, the printer b-1 receives the printer setting information, and writes the received printer setting information as its own setting information in the memory 1. The printer b-1 then operates according to this printer setting information.

Figure 16:
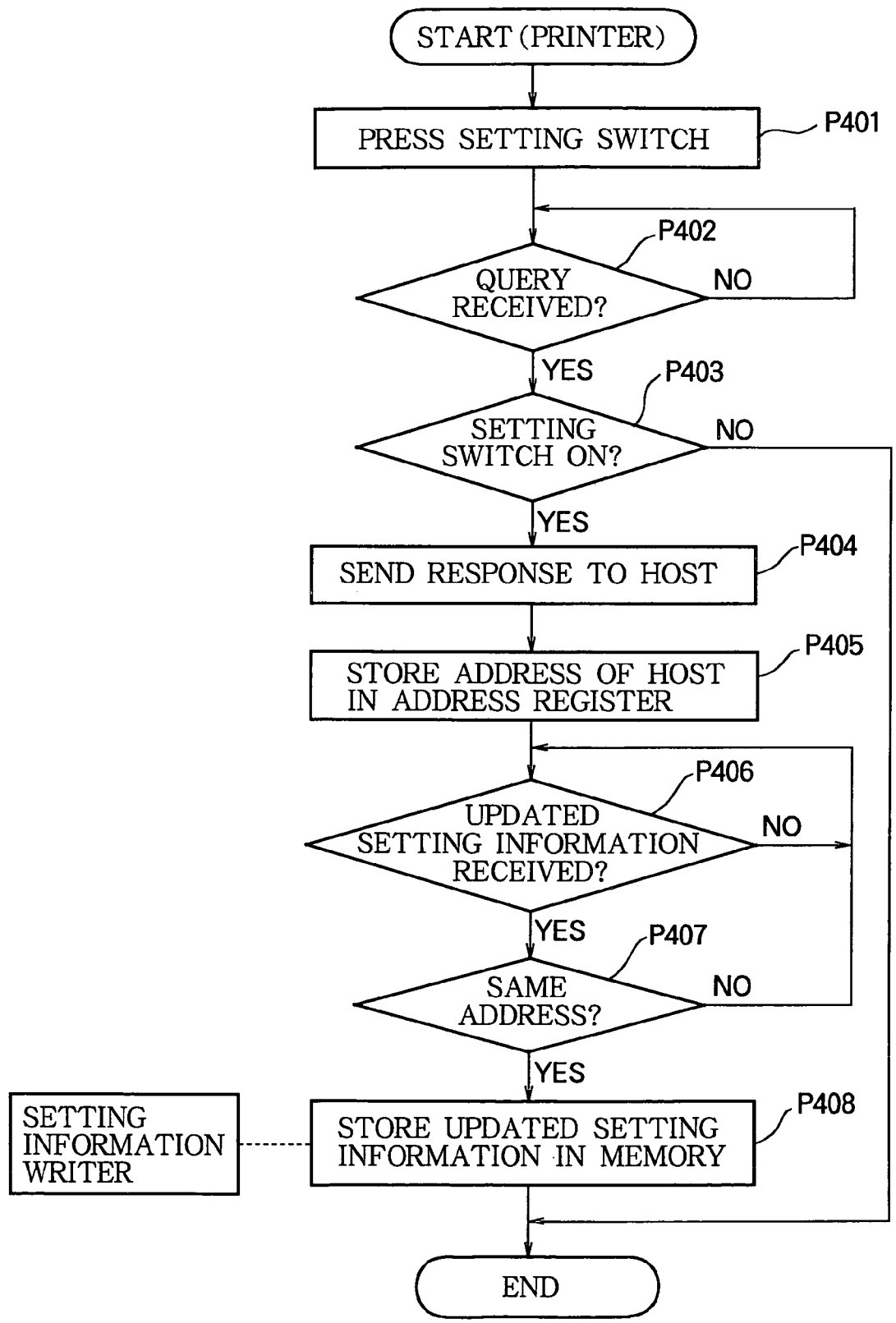
FIG. 16 is a flowchart illustrating the operation of the printer in the fourth embodiment.

In step P401 in FIG. 16, the setting switch 2 (FIG. 14) of the printer b-1 is turned on by being pressed by the operator. The printer b-1 uses this switch to indicate, in advance, that printer setting information can be accepted from a host device and written in the memory 1.

In step P402, the communication unit 5 waits for a query from a host device. When the communication unit 5 receives the query and sends the corresponding information (s2) to the decision unit 13, the operation proceeds to step P403.

In step P403, the decision unit 3 decides whether or not to respond to the information (s2), according to the information (s1) output by the setting switch 2. If the information (s1) is '1', printer setting information can be accepted, so the decision unit 3 outputs a decision (s3) enabling the response to be made, and the operation proceeds to step P404; if the information (s1) is '0', printer setting information cannot be accepted, so the decision unit 3 outputs a decision (s3) disabling the response, and the processing flow ends.

In step P404, since the decision (s3) is to enable the response, the response unit 4 sends response information (s4) to the communication unit 5. The communication unit 5 returns the response information (s4) to host device a-1 through the network c.

In step P405, the response unit 4 temporarily stores an address identifying the host device a-1 to which the response information (s4) is sent in the address register 17 as a destination address (s7).

In step P406, the communication unit 5 waits to receive printer setting information from a host device. When the communication unit 5 receives printer setting information (which may be received from any host device), it sends the source address (s8) from which the printer setting information originated to the address comparator 19, and the operation proceeds to step P407.

In step P407, the address comparator 19 compares the source address (s8) from which the printer setting information is received with the destination address (s7) temporarily retained in the address register 17. If the source address (s8) and the destination address (s7) match, the address comparator 19 sends information (s9) informing the gate 15 of the match, and the operation proceeds to step P408; if the source address (s8) and the destination address (s7) do not match, the address comparator 19 does not output this information (s9), and the operation returns to step P406.

In step P408, on receiving the information (s9) output from the address comparator 19, the gate 15 sends valid information (s5) to the memory 1 (FIG. 14). The setting information writer 6-1 executed by the printer control unit 6 writes the valid information (s5) received from the communication unit 5 in the memory 1 as new setting information. The printer b-1 then operates according to this printer setting information.

As described above, according to the fourth embodiment, since the address register 17 and the address comparator 19 are provided in the printer b-1, the printer b-1 writes, in the memory 1, only the valid printer setting information received from the host device which sent the query inquiring whether or not printer setting information can be written in the memory 1, and discards printer setting information received from a host device which did not send the query. As a result, a host device which has not sent a query cannot update the printer setting information.

In the description above, although the decision unit 3, the response unit 4, the gate 15, and the address comparator 19 are shown as dedicated hardware blocks, the invention is not restricted to the use of dedicated hardware. More specifically, the decision unit 3, the response unit 4, the gate 15, the address comparator 19, or all of them may be subsumed within the printer control unit 6, by providing suitable computer readable programs executed by the printer control unit 6.

Although the operator directly sets the setting switch in the first, second, third, and fourth embodiments above to different states, the invention is not restricted to direct manual setting of the setting switch. More specifically, the setting switch may be provided as a function the printer control unit 6, implemented by a computer readable programs executed by the printer control unit 6. The setting switch can be then set from the network.

Figure 17:
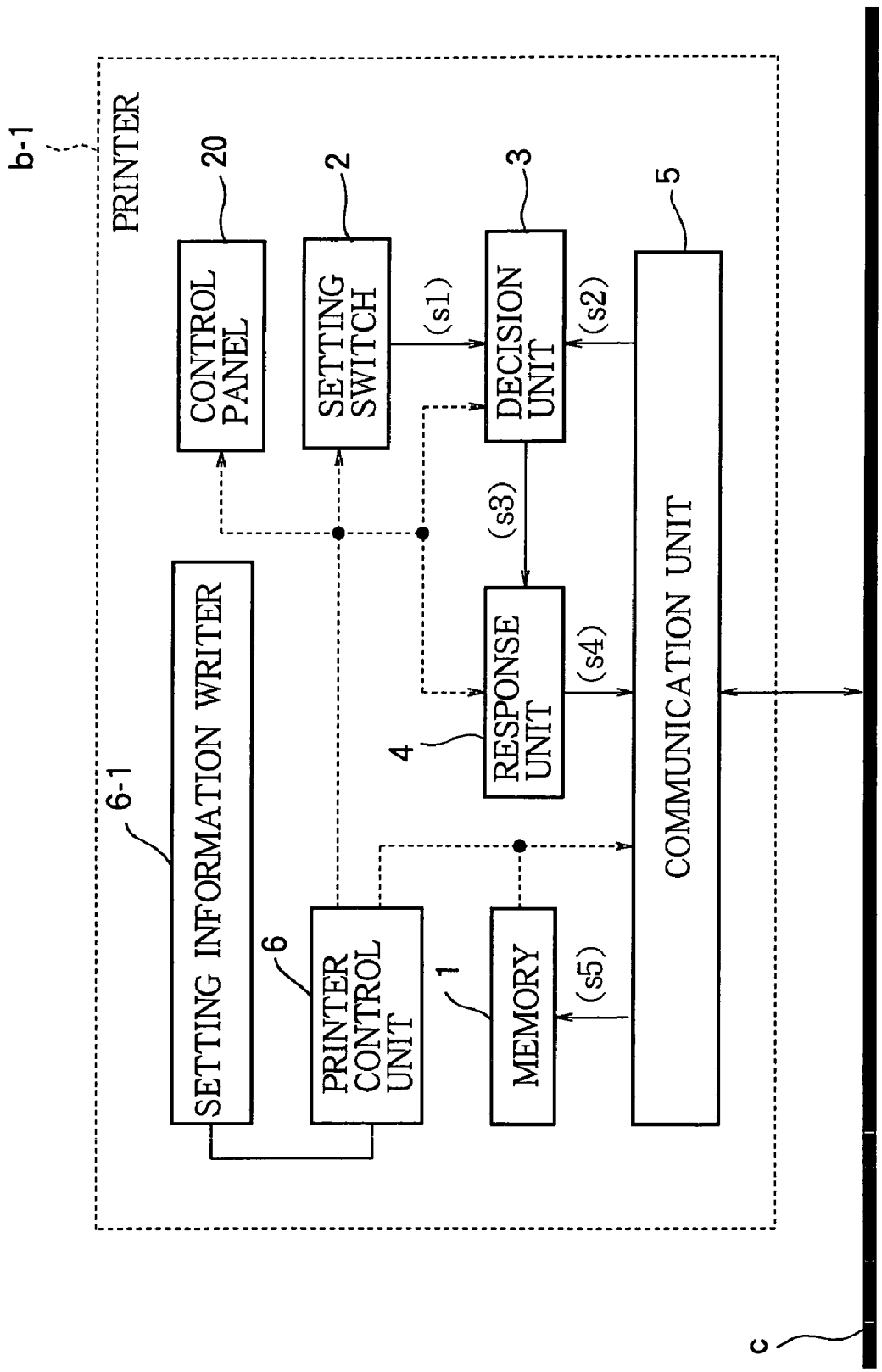
FIG. 17 is a block diagram of a printer according to a variation of the first embodiment.

Referring to FIG. 17, the printer in the first embodiment, or in any of the other embodiments, may have a control panel 20 from which the operator can enter information for changing the setting information stored in the memory 1. If the setting switch 2 is set to the state that allows printer setting information to be written in the memory 1, then the printer control unit 6 uses the setting information writer 6-1 to write the information entered by the operator in the memory 1. If the setting switch 2 is set to the state that prevents printer setting information from being written in the memory 1, then the printer control unit 6 rejects the information entered by the operator. The setting switch 2 can prevent unwanted alteration of printer setting information from either the network c or the control panel 20. Needless to say, the setting switch 2 may be settable from the control panel 20.

Those skilled in the art will recognize that further variations are possible within the scope of the invention, which is defined in the appended claims.

The invention claimed is:

1. A method for changing printing setting information stored in a nonvolatile memory provided within a device having a printing function, by means of a host device, said method comprising the steps of:
   receiving change request information for requesting change of the printing setting information, from the host device;
   deciding whether or not to permit the change of the printing setting information based on a state to which the device has been set according to manual input by means of an input unit provided on said device;
   permitting the change of the printing setting information stored in said nonvolatile memory, when a result of the decision indicates that change is permitted; and
   inhibiting change of the printing setting information stored in said nonvolatile memory, when the result of the decision indicates that change is not permitted,
   wherein the printing setting information includes at least one of a power management mode switching time, a printing density, and an IP address assigned to the device having a printing function.

2. The method of claim 1, wherein said deciding step makes the decision based on a setting of a setting switch provided on said device.

3. The method of claim 1, wherein said deciding step makes the decision based on a change permission/inhibition mode preset by a switch provided on said device.

4. A method for changing printing setting information stored in a nonvolatile memory provided within a device having a printing function, by means of a host device, said method comprising the steps of:
   setting permission information indicating whether or not to permit change of the printing setting information;
   receiving query information inquiring whether or not the printing setting information may be changed, from the host device;
   deciding whether or not to permit reception of change information for changing the printing setting information based on the permission information, when the query information has been received;
   permitting the reception of the change information when a result of the decision indicates that the reception is permitted; and
   inhibiting the reception of the change information when the result of the decision indicates that the reception is not permitted,
   wherein the printing setting information includes at least one of a power management mode switching time, a printing density, and an IP address assigned to the device having a printing function.

5. The method of claim 4, wherein said permitting step permits the reception of the change information only within a predefined time interval.

6. The method of claim 5, wherein said predefined time interval is a predetermined time from when the permission information is set to permit the reception in said setting step.

7. The method of claim 4, wherein said deciding step makes the decision based on a setting of a setting switch provided on said device.

8. The method of claim 4, wherein said deciding step makes the decision based on a change permission/inhibition mode preset by a switch provided on said device.

9. A method for changing printing setting information stored in a nonvolatile memory provided within a device having a printing function, by means of a host device, said method comprising the steps of:
   setting, in said device, permission information indicating whether or not to permit change of the printing setting information;

receiving change request information for requesting the change of the printing setting information, from the host device;

deciding whether or not to permit the change of the printing setting information based on the permission information;

permitting the change of the printing setting information stored in said nonvolatile memory, when a result of the decision indicates that the change is permitted; and inhibiting the change of the printing setting information stored in said nonvolatile memory, when the result of the decision indicates that the change is not permitted, wherein the printing setting information includes at least one of a power management mode switching time, a printing density, and an IP address assigned to the device having a printing function.

10. The method of claim 9, wherein said setting step makes the setting as to permit or inhibit the change by means of a setting switch provided on said device.

11. The method of claim 9, wherein said deciding step makes the decision based on a change permission/inhibition mode preset by a switch provided on said device.

12. A device having a printing function with printing setting information stored in a nonvolatile memory provided within said device, comprising:

a receiving unit for receiving change request information for requesting change of the printing setting information, from a host device;

a decision unit for deciding whether or not to permit the change of the printing setting information based on a state to which the device has been set according to manual input by means of an input unit provided on said device; and a setting information changing unit for permitting the change of the printing setting information stored in said nonvolatile memory, when a result of the decision indicates that the change is permitted, and inhibiting the change of the printing setting information stored in said nonvolatile memory, when the result of the decision indicates that the change is not permitted, wherein the printing setting information includes at least one of a power management mode switching time, a printing density, and an IP address assigned to the device having a printing function.

13. The device of claim 12, wherein said decision unit makes the decision based on a setting of a setting switch provided on said device.

14. The device of claim 12, wherein said decision unit makes the decision based on a change permission/inhibition mode preset by a switch provided on said device.

15. A device having a printing function with printing setting information stored in a nonvolatile memory provided within said device, comprising:

a setting unit for setting permission information indicating whether or not to permit change of the printing setting information;

a receiving unit for receiving query information inquiring whether or not the printing setting information may be changed, from a host device;

a decision unit for deciding whether or not to permit reception of change information for changing the printing setting information based on the permission information, when the query information has been received; and a setting information changing unit for permitting the reception of the change information when a result of the decision indicates that the reception is permitted, and inhibiting the reception of the change information when the result of the decision indicates that the reception is not permitted, wherein the printing setting information includes at least one of a power management mode switching time, a printing density, and an IP address assigned to the device having a printing function.

16. The device of claim 15, wherein said permitting unit permits the reception of the change information only within a predefined time interval.

17. The device of claim 16, wherein said predefined time interval is a predetermined time from when the permission information is set to permit the reception in said setting unit.

18. The device of claim 15, wherein said decision unit makes the decision based on a setting of a setting switch provided on said device.

19. The device of claim 15, wherein said decision unit makes the decision based on a change permission/inhibition mode preset by a switch provided on said device.

20. A device having a printing function with printing setting information stored in a nonvolatile memory provided within said device, comprising:

a setting unit for setting permission information indicating whether or not to permit change of the printing setting information;

a receiving unit for receiving change request information for requesting change of the printing setting information, from a host device;

a decision unit for deciding whether or not to permit the change of the printing setting information based on the permission information; and a setting information changing unit for permitting the change of the printing setting information stored in said nonvolatile memory, when a result of the decision indicates that the change is permitted, and inhibiting the change of the printing setting information stored in said nonvolatile memory, when the result of the decision indicates that the change is not permitted, wherein the printing setting information includes at least one of a power management mode switching time, a printing density, and an IP address assigned to the device having a printing function.

21. The device of claim 20, wherein said setting unit makes the setting as to permit or inhibit the change by means of a setting switch provided on said device.

22. The device of claim 20, wherein said decision unit makes the decision based on a change permission/inhibition mode preset by a switch provided on said device.

23. The device of claim 20, wherein the printing setting information includes the power management mode switching time.

24. The device of claim 20, wherein the printing setting information includes a printing density.

25. The device of claim 20, wherein the printing setting information includes the IP address assigned to the device having a printing function.

* * * * *